United States Patent [19]
Yevick

[11] Patent Number: 4,671,606
[45] Date of Patent: Jun. 9, 1987

[54] DISSECTING OPTICAL VIEWER AND RECORDER

[76] Inventor: George J. Yevick, 536 Nordhoff Dr., Leonia, N.J. 07605

[21] Appl. No.: 714,806

[22] Filed: Mar. 22, 1985

[51] Int. Cl.⁴ .............................................. G02B 6/00
[52] U.S. Cl. .............................. 350/96.10; 350/96.12; 350/96.18; 350/96.27; 350/320
[58] Field of Search ............... 350/96.10, 96.11, 96.12, 350/96.24, 96.25, 96.27, 96.18, 114, 320

[56] References Cited

U.S. PATENT DOCUMENTS

| 3,718,515 | 2/1973 | Goldstein | 350/96.24 X |
| 3,728,422 | 4/1973 | Sugaya | 264/134 X |
| 4,523,803 | 6/1985 | Arao et al. | 350/96.14 X |
| 4,548,464 | 10/1985 | Auracher et al. | 350/96.12 X |

FOREIGN PATENT DOCUMENTS

0034184 6/1951 Poland ................... 350/114

Primary Examiner—John Lee
Attorney, Agent, or Firm—Thomas J. Greer, Jr.

[57] ABSTRACT

An optical reader for magnifying and viewing stored optical images, such as microimages on a microfiche. Each of a plurality of stacked and internally reflecting sheets is provided at its input end with its own lens, the lens lying within the sheet. The other or output end of each sheet is skived at an angle of 45 degrees to project light, which passes along and within the sheet, orthogonally out of the plane of the sheet for viewing. The skived ends of the stacked sheets are staggered or spaced from each other. Input light, as for example light from a microimage, is projected onto the input ends of the stacked sheets. Each sheet receives its corresponding portion of the input image. The lens of each sheet magnifies that sheets light portion or share as the light passes along the sheet towards the skived output edge for viewing. Magnification is achieved in one direction by the (sheet contained) lenses, and in an orthogonal direction by the spacing between the staggered, skived output ends.

28 Claims, 30 Drawing Figures

DISSECTING OPTICAL VIEWER AND RECORDER

This invention relates to an optical device and more particularly for an optical device for magnifying microimages, such as microimages on a microfiche.

A variety of techniques has evolved for magnifying microimages or the like, such as those methods and apparatus described in my U.S. Pat. Nos. 4,173,399 and 4,110,014, and 3,950,769 and 3,864,034.

Perhaps the most well known method of magnification is to employ a lens, with light from the object passing through the so-called objective lens and one or more additional lenses for final projection and/or viewing. This is the method employed in the usual microscope. It is also the method used in the projection of motion picture images, with the throwing distance in this case being rather large. Another method is that disclosed in some of my prior patents, above noted, wherein an image is broken up or dissected into a plurality of sub-objects by means of totally internally reflecting fiber optic elements. The input ends of the fiber optic elements may be rather densely spaced or packed together, while the output ends are spaced apart somewhat. This also yields magnification of a flat object over two mutually orthogonal directions. The use of optic fibers in magnifying apparatus has however not been entirely satisfactory because of difficulties in maintaining the necessary alignment of the optic fibers relative to, for example, the viewing screen.

Figure 1:
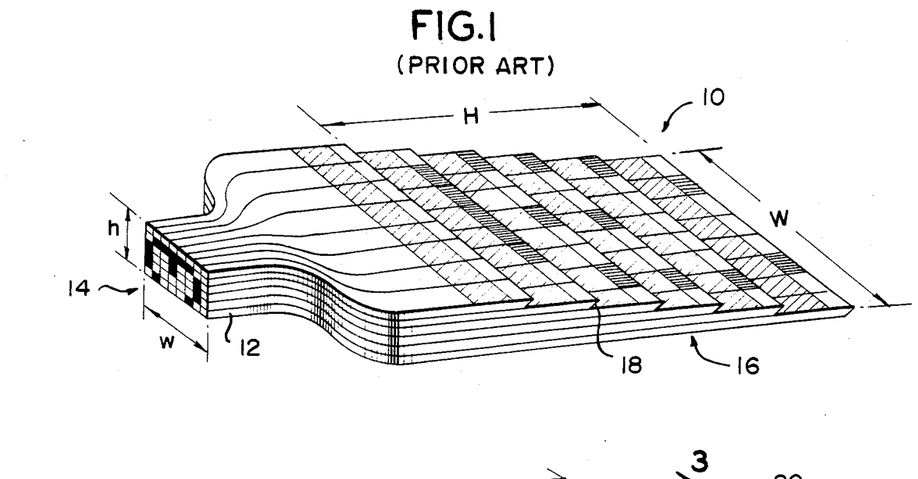
FIG. 1 is a view similar to FIG. 9 of U.S. Pat. No. 3,728,422 of Apr. 17, 1983, issued to Sugaya.

Insofar as I am aware, no method or appartus of optical magnification employing internally reflecting sheet elements with the equivalent of objective lenses therein has evolved prior to this invention. Optical magnifying devices which employ sheet-like elements are, however, already known. For example, U.S. Pat. No. 3,728,422 issued to Sugaya discloses at FIGS. 6–9 an apparatus employing sheet-like elements is in reality simply a squeezed-down group of totally internally reflecting fiber optic rod elements, with each rod element being bounded by its own cladding layer. In the noted Sugaya patent, magnification in a stepping down direction of a stepped optic viewing face (see FIGS. 8 and 9 of the Sugaya patent) is apparently obtained by spacing the output edges of the several steps apart from each other, this spacing being greater than the corresponding spacing between the input edges of each (composite) sheet-like element. However, the magnification in a direction parallel to the steps of the open stepped face structure shown at FIGS. 8 and 9 of Sugaya patent is such that the resultant magnified image appears discontinuous.

According to the practice of this invention a faithful output image is provided of an input image, such as a microimage input image, by the use of internally reflecting sheets, wherein the input edges of the sheets are bunched together, preferably being in contact, and wherein each sheet is provided with a lens element. The lens element, in general, is contained within each sheet. The output viewing portion of the optical magnifier is similar to that shown in FIGS. 8 and 9 of the noted Sugaya patent. However, the mechanism of magnification is different. In the Sugaya magnifying apparatus, light passing from the input end of each (composite) sheet-like element is compelled to pass along the several distinct and separate optical channels of the sheet, wherein each optical channel is defined by its own optical cladding. In this invention, in distinction, all light entering any of the sheet elements is constrained to travel in a path therealong determined by the optical properties of the lens associated with each sheet. Each sheet may be regarded as a single optical system. Further according to this invention, the property of the limit of resolution of the human eye is utilized to effectively magnify in a direction parallel to the stepping down direction of the optical output face. Namely, the spacing between the output edge of the sheets is about six mils, for the customary viewing distance of about ten inches. This corresponds to the limit of resolution of the human eye which is about 0.0003 radian.

Referring now to FIG. 1 of the drawings, the above-mentioned Sugaya construction shown at FIG. 9 of that patent is illustrated. The numeral 10 denotes generally the viewing device, the device defined by a plurality of stacked sheet elements 12 having a narrowed input area 14. The numeral 16 denotes generally the viewing portion of the device, with each of the sheets 12 having a beveled edge denoted by the numeral 18. The edges 18 may or may not be mirrored, the action being such that light entering the input face 14, over an area having a thickness h and a width w is projected along the sheets 12, striking biased surfaces 18 and projected upwardly for viewing. The output area is of a dimension H and the longitudinal direction at a dimension W in the transverse direction. The apparent magnification of this device is the ratio of H×W divided by h×w. In practice, the magnification along the direction H may be different from the magnification along the direction W. While apparently satisfactory for the purpose intended, the sheets 12 of Sugaya are defined by a squeezed-down group of totally internally reflecting fiber optic rod elements, with each rod element being bounded by its own cladding layer. This may be seen, for example, by reference to FIGS. 4 and 5 of the Sugaya patent.

One disadvantage of the Sugaya construction is that optical information entering the face 14, at any one of the illustrated small squares, travels along its corresponding channel in the wider or right hand portion of the device shown at FIG. 1, thus the information spreads from a small cross-sectional area to a large cross-sectional area. In making this transition of cross-sectional areas, the optical information becomes totally chaotic, the only information available at the output edges 18 is, in effect, the average intensity of the optical input.

Figure 2:
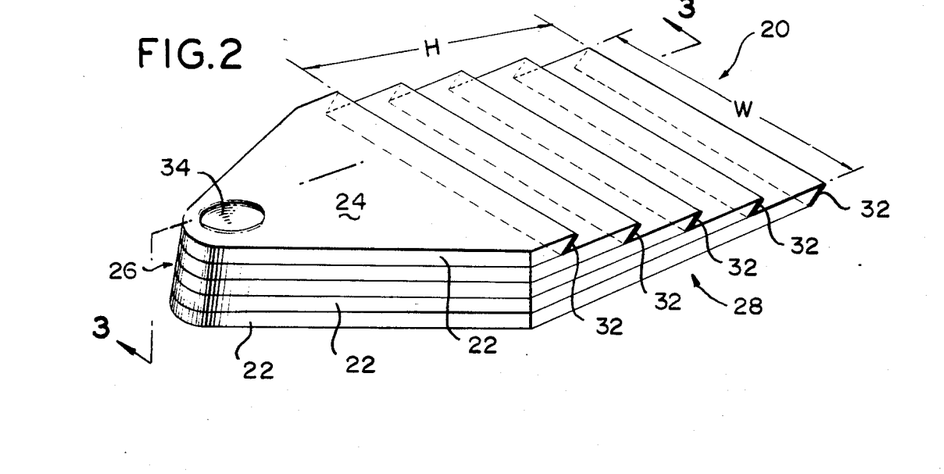
FIG. 2 is a perspective view of one embodiment of the optical magnifying device of this invention.
Figure 3:
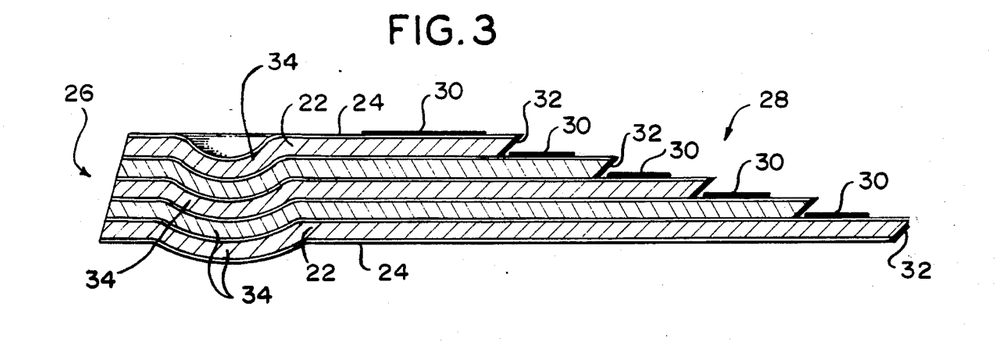
FIG. 3 is a view taken along section 3—3 of FIG. 2.

Referring now to FIGS. 2 and 3, an embodiment of the present invention is illustrated. The numeral 20 denotes in general the optical magnifying element and is defined by a plurality of stacked sheets 22. As illustrated at FIG. 3, each of the transparent sheets 22 is coated by a cladding of lower index of refraction. This yields or results in each sheet being totally internally reflecting. It is well known in this art that a transparent element, such as a fiber or sheet of plastic, may be coated with a cladding having a lower index of refraction to render the fiber or sheet totally internally reflecting. The entrance face is denoted generally by the numeral 26 with the output area or face denoted generally by the numeral 28. The input area 14 of FIG. 1 would correspond, accordingly, to numeral 26 of FIGS. 2 and 3, while the output area 16 of the prior art device of FIG. 1 would correspond to numeral 28 of FIG. 2 and 3. The upper light output or exit surface portion of each sheet 22 is coated along a longitudinal edge thereof with an opaque coating 30. The numeral 32 denotes a biased or slanted light output edge of each sheet 22, the edges 32 may be either silvered so as to render them reflecting, or may be unsilvered. In the latter case, light advancing along the length of the device 20, in any one of sheets 22, will exit perpendicularly, in a direction upwardly in FIG. 3 for example, whether the edges 32 are silvered or are left plain. In this latter case, there will be total internal reflection, as is well known in the case, for example, of an uncoated optical prism.

The numeral 34 denotes a two-dimensional geodesic lens in each of the sheets 22, the lens having the same index of refraction as that of its sheet. A two-dimensional lens, in this invention, refers to a lens wherein both incoming and outgoing light pass through the lens in a direction generally parallel to the surfaces of the lens. This is in distinction to the more common so-called three-dimensional lens wherein incoming and outgoing light pass through the lens in a direction generally at right angles or orthogonal to the surfaces of the lens. The reader will observe that there are several types of two-dimensional lenses which are already known in the optic arts. There are certain classes of two-dimensional lenses which are referred to as geodesic lenses. As will be later discussed relative to FIG. 8, the nested geodesic lenses of FIGS. 2 and 3 have different focal lengths.

Figure 4:
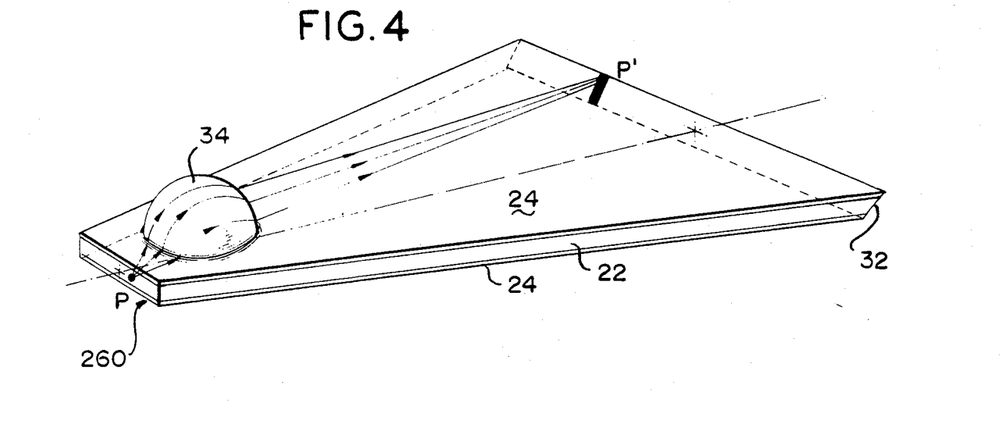
FIG. 4 is a perspective view of a single totally internally reflecting sheet including a geodesic lens.

The action of the magnifying device illustrated at FIGS. 2 and 3 will now be explained by reference to FIG. 4. In FIG. 4, the light from an object, such as a portion of a microimage of a printed page, enters the entrance face of a typical single sheet 22 is denoted by the numeral 260, this face being on one of the sheets which make up the entire entrance face 26 of FIGS. 2 and 3.

A point source of light at the input edge 260 is denoted by P. The light from the point source P passes along the sheet and into a two-dimensional lens 34. The rays of light passing through lens 34 become focused at point P′ on output edge 32 of sheet 22. It should here be observed that while only a single two-dimensional lens 34 is illustrated, more than one could be used for any single sheet 22.

The reader will now readily comprehend that any number of points P on the input edge 260 will be imaged as corresponding points P′ on the output edge 32.

As in the case with the prior art magnifying device of FIG. 1, the input area of any of the stacked optical sheets 22 is less than the output area, i.e., the area of input face 260 of FIG. 4 of any one sheet is of lesser area than the output face area 32. However, in distinction to the noted prior art Sugaya construction, the two-dimensional lens 34 of this invention prevents the scrambling of optical information due to the increase in the cross-sectional area as the light travels from left to right, down each optical sheet, from its input to its output edge, as happens with Sugaya. In Sugaya, the input light is not focused as it travels, rather it expands (so to speak) along each channel (see FIG. 6 of Sugaya) as each channel increases in cross-sectional area. The way optical scrambling (loss of resolution) is prevented is by the focusing action of the two dimensional lenses 34. All optical information along the narrow surface of input face 260 will be correspondingly imaged along face 32 at the output edge of the sheet. This is the essence of the subject invention.

As in the case with the prior art device shown at FIG. 1, the magnification along the optical device, in a longitudinal direction H of FIG. 1 and of the corresponding direction of the device of this invention shown at FIGS. 2 and 3, is determined by the spacing between the output edges 32. The magnification of the optical device of FIGS. 2 and 3, in the longitudinal direction of the viewer (corresponding to the direction H of FIG. 1) is the ratio of the distance between adjacent output edges 32 to the thickness of the sheets 22. The magnification transversely of the device of FIGS. 2 and 3, corresponding to the transverse direction W of FIG. 1, is dependent upon the optical properties of the two-dimensional lens 34. In most applications, these two magnifications, one longitudinal and one transverse, are equal. However, it will be understood that they may be made different for certain applications.

The output faces 32 may be regarded as magnified rectangles which are spaced from each other, these rectangles being magnifications of smaller, input rectangles at the input face or portion 26 wherein the input image of an object is formed.

Figure 5:
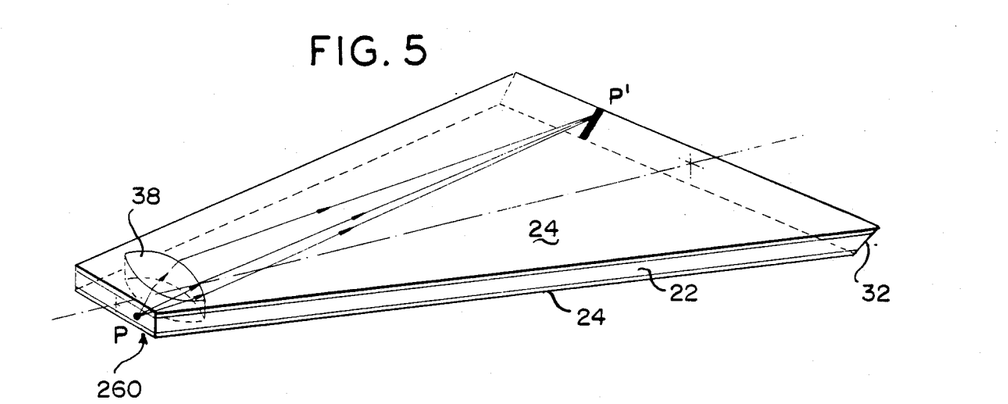
FIG. 5 is a perspective view of a single sheet of an optical magnifying device according to this invention wherein an inserted two-dimensional lens is employed instead of a geodesic lens.

Referring now to FIG. 5 of the drawings, a modification of a typical optical sheet 22 of the magnifier of FIGS. 2 and 3 is shown, the difference being that the two-dimensional lens, denoted by the numeral 38 in FIG. 5, is an inserted lens, having a different index of refraction than the index of refraction of transparent sheet 22. The lens 38 may be separately formed and placed into a formed aperture in sheet 22, or alternatively, in accordance with known techniques, lens 38 may be formed by ion bombardment of sheet 22 to thereby change the index of refraction of the sheet at the bombarded area.

Figure 6:
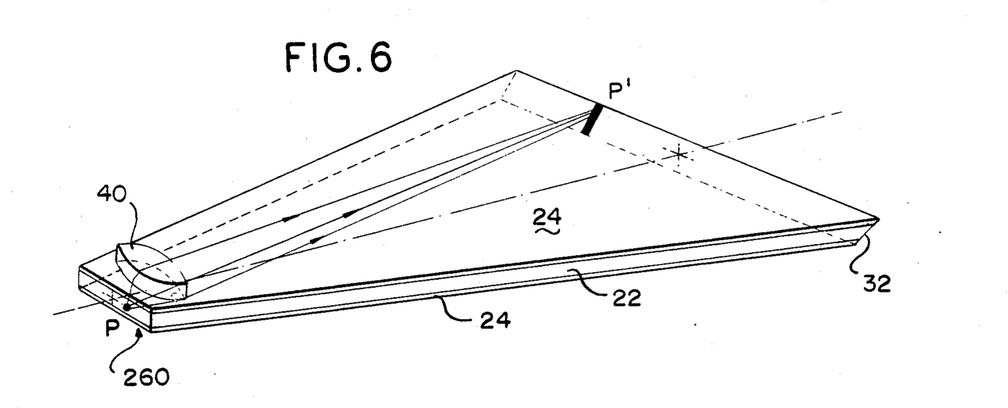
FIG. 6 is a perspective view of an optical sheet of the magnifying device of this invention wherein a stepped-up, two-dimensional lens is employed instead of a geodesic lens.

Referring now to FIG. 6, a further modification of a typical sheet 22 of the viewer in FIGS. 2 and 3 is illustrated. The sheet 22 has the same configuration as previously described with respect to FIGS. 4 and 5, except that the two-dimensional lens, now bearing the reference numeral 40, defines a thickened portion, near the input area of sheet 22. Lens 40 may either be integral with sheet 22 or may be separately formed and affixed. In the latter case, the index of refraction of the separate lens 40 may be the same or may be different from the index of refraction of sheet 22. In the case wherein lens 40 is fashioned integrally, as by molding of sheet 22, the thickened portion will function as a two-dimensional lens, as is known in the art. Namely, for very thin sheets of transparent material, a thickening of such a sheet, at any given area, will change the index of refraction at that area.

It should now be pointed out that the magnification in the transverse direction, corresponding to direction W of FIG. 1, is dependent on the position of the two-dimensional lens placed in each sheet. Because the length of each of the stacked sheets 22 is different, clearly some provision relating to the locations of the several two dimensional lenses must be made to account for this difference, in order that the output image wil be free of distortion. There are essentially two ways of carrying this out. One way is shown at FIG. 7 and another way is illustrated at FIG. 8.

Figure 7:
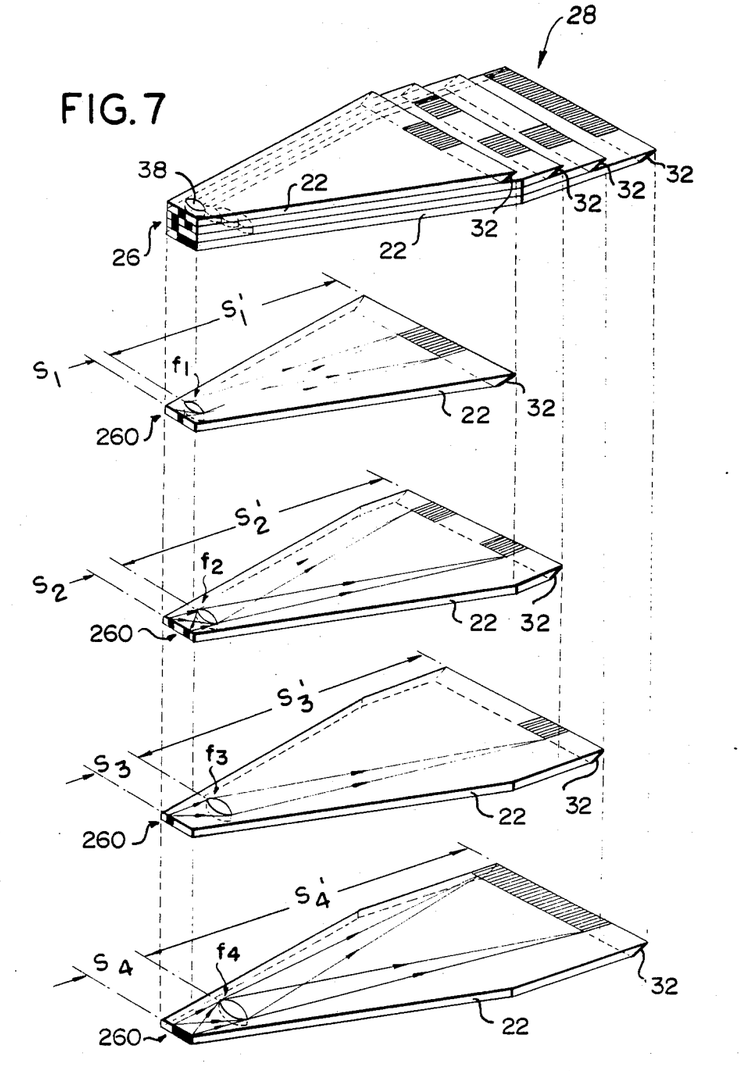
FIG. 7 is a view illustrating the action of the magnifying device of this invention employing, for purposes of illustration, four sheets, each sheet being similar to the sheet illustrated at FIG. 5.
Figure 8:
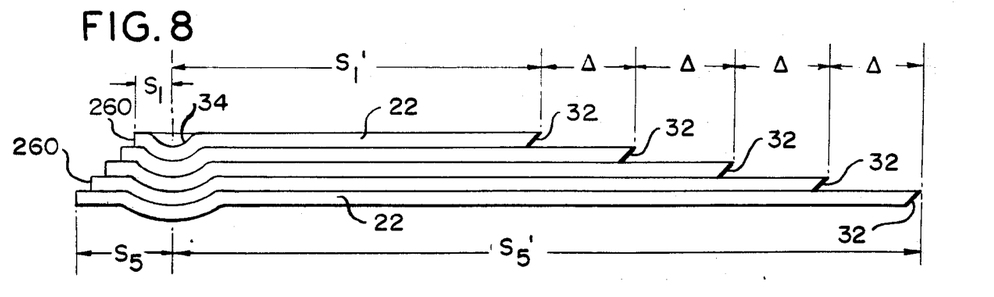
FIG. 8 is a cross-sectional view similar to FIG. 3 and illustrates certain quantitative relations between the different optical parameters of the several sheets illustrated, taken in connection with the description of that Figure.

Referring now to FIG. 7 of the drawings, an optical magnifier or microreader employing the sheet of FIG. 5 is illustrated. The reader at FIG. 7, at the top portion thereof, is shown for purpose of illustration, as defined by four stacked sheets 22. The uppermost or first of the four sheets 22 contains a two-dimensional lens denoted by $f_1$. This lens is positioned relative to the input and output ends of top sheet 22 as illustrated, the ratio of the output distance $S'_1$ to the input distance $S_1$ being as indicated, this being the magnification $m_w$ in the direction W.

The second or next lowest sheet 22 contains a similar lens $f_2$, of a different power (different focal length) than lens $f_1$, but the lens is positioned more towards the light output end. Here, the ratio is $S'_2$ to $S_2$, this ratio also being $m_w$ and equal to $S'_1$ divided by $S_1$. The third and fourth sheets 22 have their corresponding two-dimensional lenses $f_3$ and $f_4$ positioned progressively closer, respectively, to their respective output edges 32. Their magnifications are also equal to $m_w$.

Considering now microimage information striking the top or uppermost sheet 22, along its respective input edge or end 260, this light will pass through lens $f_1$ and be imaged along the corresponding output edge 32.

The second or next lowest sheet 22, being longer, will require that the two-dimensional lens be placed further along the length of its sheet, towards its output end, so that the same magnification along its output edge 32 will obtain. This is readily seen by recalling that the throwing distance of a lens, denoted by $S'$ is equal to $(m+1)f$, where m is the magnification and where f is its focal length. Because the magnification of each sheet 22 at the viewing area 28 must be the same (to avoid distortion), f must increase as $S'$ increases. The same is true for the third and fourth sheets of FIG. 7. Thus, with the lenses $f_1$, $f_2$, $f_3$ and $f_4$ being of the different focal lengths, and by shifting the progressively farther from the input edge of surface 260 of their respective sheets 22, no distortion between any two output edges 32, as seen by the viewer, wil take place.

Another method of compensation (see FIG. 8) for the different throwing distances of the several stacked sheets 22 (a throwing distance being the distance from a lens to its projected image) is to arrange the two-dimensional lenses all at one point along the viewer, and to have successively different distances from the input edge of each sheet to its own lens, to thereby compensate for the different lengths of the sheets. This follows from the known relation that the magnification m is equal to $S'/S$, where $S'$ is the throwing distance and S is the object distance. The m is constant for all of the lens in all of the sheets, and $S'$ is increasing, then S must also increase. In FIG. 8 the two dimensional lenses are in the same vertical plane, i.e., coaxial, and are also of different focal lengths. The entrance faces 260 are staggered, so as to define different object distances. Clearly, the analysis of FIG. 8 applies to the embodiment of FIGS. 2 and 3.

The embodiment of FIG. 7 can be used with the sheet construction shown at FIG. 5. The embodiment of FIG. 8 can be used with nested geodesic lenses, corresponding to the embodiment of FIG. 4.

Although the above description has treated the optical devices of this invention as magnifying devices, it is apparent that they may be used as optical reduction devices.

Figure 9:
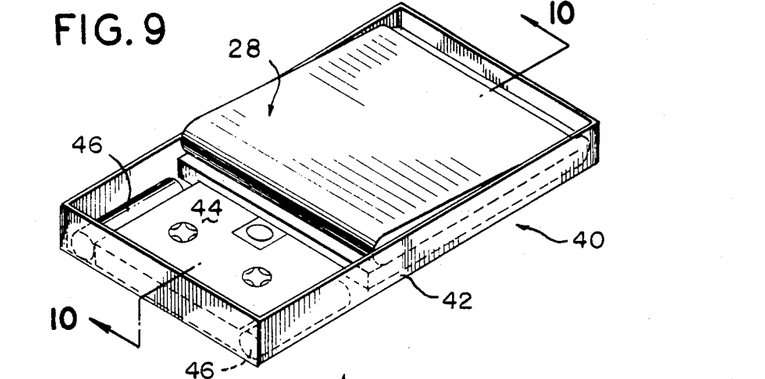
FIG. 9 is a perspective view of a magnifying device according to the practice of this invention wherein the totally internally reflecting, magnifying sheet elements have been folded so as to reduce the size of the magnifying device.
Figure 10:
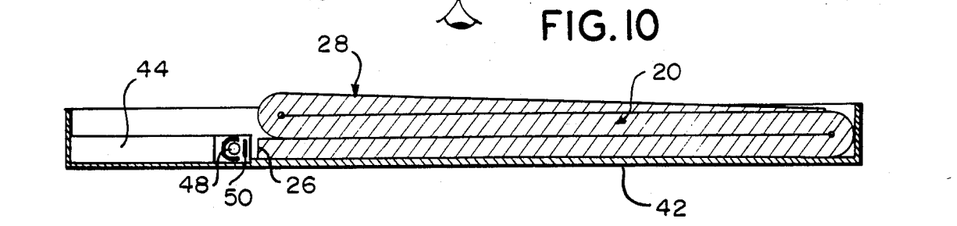
FIG. 10 is a view taken along section 10—10 of FIG. 9.

Referring now to FIGS. 9 and 10 of the drawings, the numeral 40 denotes generally a compact viewer embodying a typical optical magnifying device of this invention. A case 42 holds and supports a folded magnifying device 20, the latter having a viewing portion 28. The numeral 44 denotes generally a film cassette whose reels are wound with a film which carries optical information thereon, as for example, a motion picture. The device may be powered by the battery cells 46. A lamp 48 illuminates the optical film 50 carried within cassette 44, the information on film 50 being projected upon the entrance face 26 of the magnifying device. The magnifying device is here illustrated as folded, once counterclockwise at the right hand portion of FIG. 10 and once clockwise at the left hand portion. In this manner, only the stepped viewing area 28 is exposed and viewed by the reader.

Figure 11:
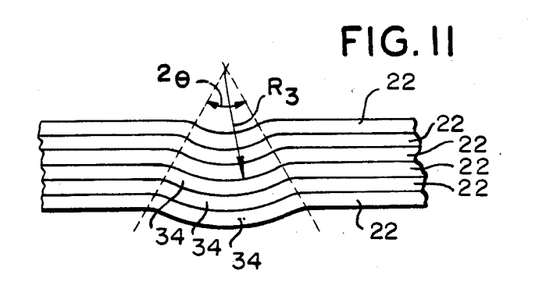
FIG. 11 is a cross-section of a portion of nested geodesic lenses of the modulation of FIG. 8.

Referring now to FIG. 11 of the drawings, a magnified cross-section of the nested geodesic lenses of FIG. 8 is shown. In practice, economies of manufacture may be realized by simply distorting a stacked sheet of totally internally reflecting sheets 22 so that the radius of curvature of each of the spherical two-dimensional geodesic lens elements 34 is different. This different radius of curvature is denoted by $R_3$ at FIG. 11. Varying the radius of curvature of each of the two-dimensional lenses 34 will vary the focal length. The description of FIGS. 7 and 8 treated the case wherein each of the two-dimensional lenses was of a different focal length, whether these lenses were of the type of FIG. 5 or of the type of FIG. 4. According to the practice of this invention, the stacked geodesic lenses 34 must be of different focal lengths, in order that the magnification of each sheet 22 at the viewing zone 28 of the assembly 20 be the same.

Figures 12, 14, 15:
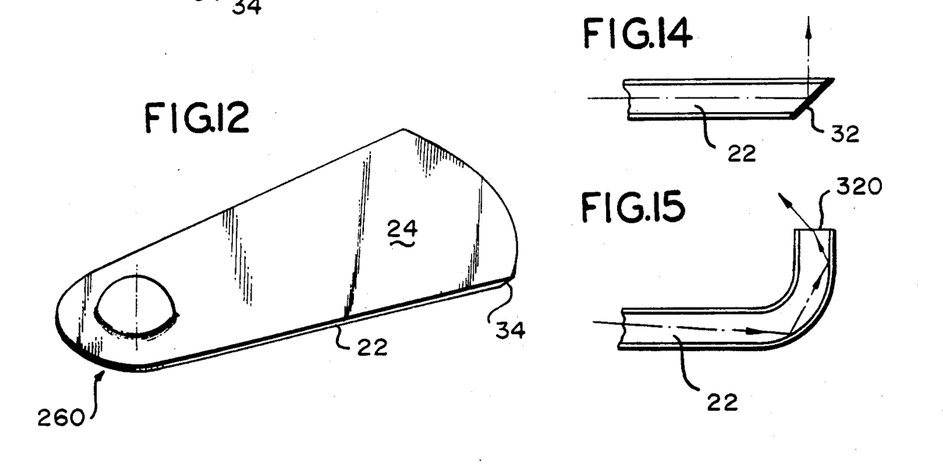
FIG. 12 is a perspective view of a sheet similar to that of FIG. 4 wherein the optical input and output edges are curved.
FIG. 14 is a view similar to FIG. 13, wherein a mirrored exit edge is employed for reflection, instead of using total internal reflection.
FIG. 15 is a view similar to FIG. 13, except that the exit edge of the sheet is bent 90 degrees for viewing.

Referring now to FIG. 12 of the drawings, a variation is illustrated wherein the input surface 260 of any of the sheets 22 are curved, as is the output surface 34 in order to optimize the quality of the final image.

Figure 13:
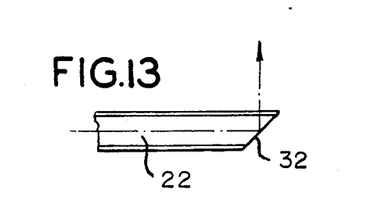
FIG. 13 is a cross-sectional view of the light output or viewing edge of a sheet, such as shown at FIG. 4, wherein total internal reflection is employed to project the light from the sheet for viewing.

Referring now to FIGS. 13, 14 and 15, three variations of the output edges of the sheets are illustrated. FIG. 13 shows the case wherein the output edge of any sheet 22 is uncoated, reflection normally taking place by the well known effect of total internal reflection. FIG. 14 shows the case wherein the output edge 32 is mirrored, as by applying silver to the edge. In FIG. 15, the output edge of any sheet 22 is continued, so to speak, and bent upwardly at right angles to the general plane of sheet 22 to define an optic output edge 320.

Figure 16:
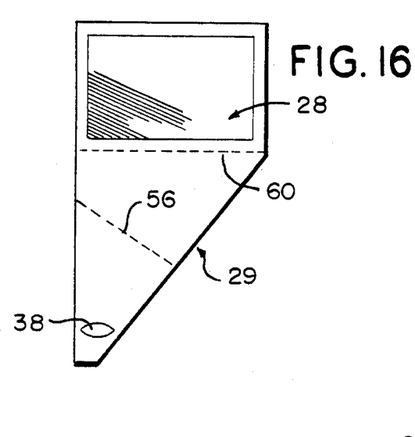
FIG. 16 is a view of an optical magnifying device such as shown at FIGS. 2 and 3 prior to folding to form a book type viewer.
Figure 17:
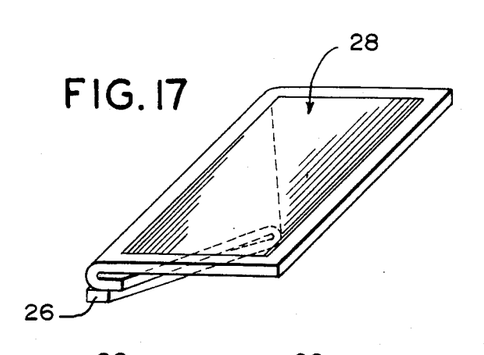
FIG. 17 is a view illustrating the device of FIG. 16 after folding.
Figure 18:
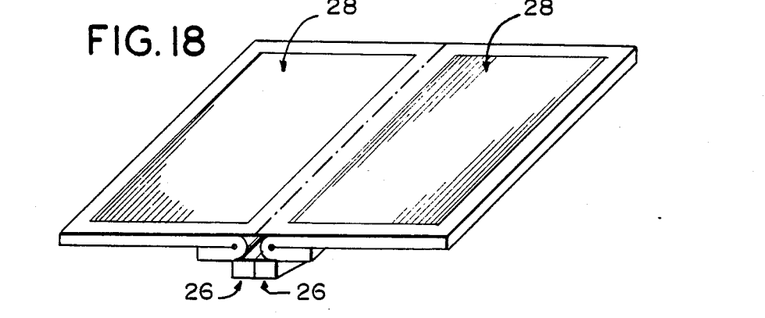
FIG. 18 is a perspective view illustrating the magnifying device of this invention in the form of a book viewer.

Referring now to FIG. 16, an optical magnifying device of the type shown at FIGS. 2 and 3 is illustrated, here provided with the inserted lens element shown at FIG. 5. Again, the numeral 28 denotes the stepped viewing area. The numeral 29 denotes an intermediate portion between the inserted lenses 38 and viewing area 28. A fold axis 56 is located where indicated, and a second fold axis 60 also located where indicated. After folding along the axes of FIG. 16, a configuration such as shown at FIG. 17 is obtained. Thereafter, two of the devices shown at FIG. 17 are placed together to form a composite structure shown at FIG. 18. FIG. 18 clearly illustrates the location of the entrance face 26 for each of the two magnifying devices.

Figures 19, 20:
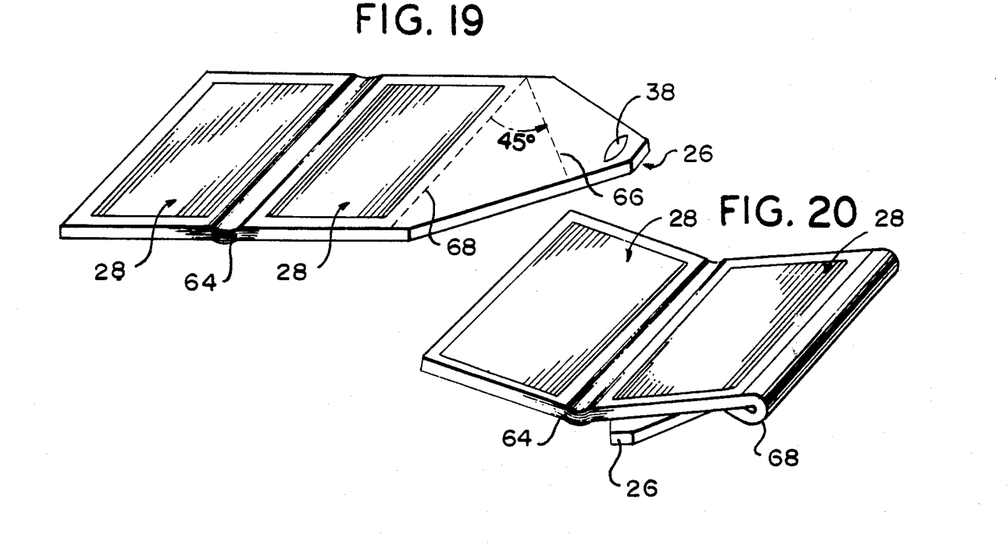
FIG. 19 illustrates another book type viewer, shown in FIG. 20, prior to folding.
FIG. 20 is a view of a book type viewer similar to FIG. 18, but with a flexible hinge.

Referring now to FIGS. 19 and 20, a variation of the composite reader shown at FIG. 18 is illustrated. In FIG. 19, an optical magnifying device such as shown at FIGS. 2 and 3 is illustrated, here employing a lens such as shown at FIG. 5. The stepped viewing areas 28 are doubled, with a flexible hinge 64 between them. The flexibility of hinge 64 is derived from the natural resiliency of the transparent sheets 22, typically fashioned of a plastics material such as polymethylmethacrylate. Fold lines 66 and 68 are provided, so that when the device of FIG. 19 is folded, the resultant reader of FIG. 20 is obtained.

Figures 21, 22, 23:
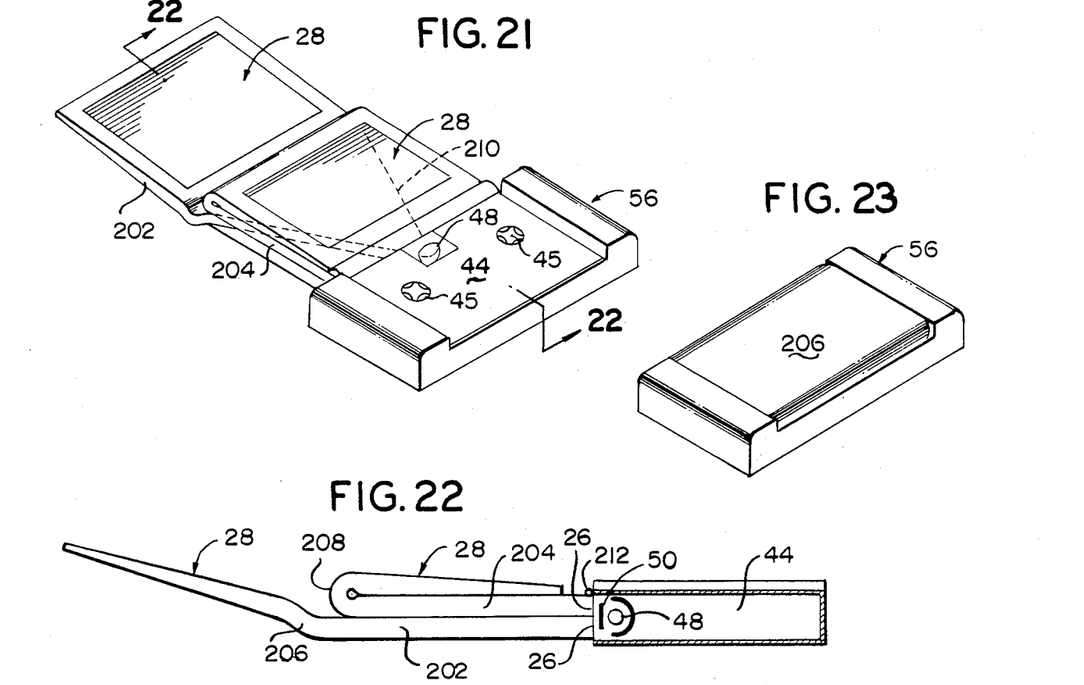
FIG. 21 is a perspective view of another embodiment of a compact optical viewer fashioned in accordance with this invention.
FIG. 22 is a cross-section taken along line 22—22 of FIG. 21.
FIG. 23 illustrates the viewer of FIG. 21 in the folded configuration.

FIGS. 21, 22 and 23 illustrate another compact and portable optical viewer.

The numeral 28 again indicates the stepped viewing surface, there being two such viewing surfaces or areas as may be seen by reference to FIGS. 21 and 22. In this embodiment, there are two reading devices of the type generally shown at FIGS. 2 and 3 of the drawings, the lower one being denoted by the numeral 202 and the upper one being denoted by the numeral 204. The input end or right hand ends of devices 202 and 204 are tapered towards the right, the tapered surface is being denoted by the numeral 210 at FIG. 21. The input end to the tapered portion of each of the stacked optical devices 202 and 204 is again denoted by the numeral 26. The numeral 44 denotes, again, a film cassette wound upon two reel elements 45 and carrying optical film 50 illuminated by lamp 48, the latter powered by batteries, not illustrated. A case denoted generally by the numeral 56 carries the motor for turning the reel elements 44 and 45 and for carrying the not illustrated batteries. In operation, with particular reference to FIG. 21, the device is commenced by operating a switch (not shown) to cause reel elements 45 to turn, thereby transporting film 50 having, for example, micro information on it, this information being projected by virtue of illumination source 48 onto the input faces 26 of the stacked sheet devices 202 and 204. In a manner previously described with respect to the embodiment of FIGS. 2 and 3, for example, the viewer sees stepped viewing sections 28, much as in the pages of a book. After the cassette 44 has been exhausted, and no further viewing being desired, element 202 is folded at flexible hinge portion 206 and element 204 is folded at flexible hinge portion 28, with the entire stacked sheet assembly pivotting along pivot 212 to fold into the case 56, to thereby define a compact and closed reader shown in FIG. 23.

Figure 24:
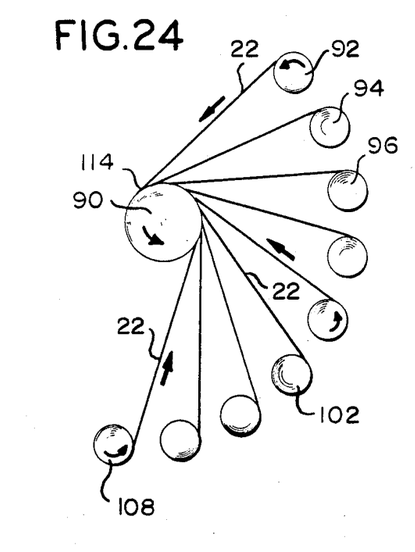
FIG. 24 is a partially schematic view illustrating a method of making the optical viewer of this invention.

Referring now to FIG. 24, one method of forming an optical device such as shown at FIGS. 2 and 3 of this invention is illustrated. While FIGS. 2 and 3 have illustrated an optical device having five sheets 22, with four such sheets 22 being shown in the illustration of FIG. 7, in practice, many hundreds of sheets are employed. In order to define a stack or layer of several hundreds of sheets, the process illustrated at FIG. 24 may be employed. The numeral 90 denotes a main winding roll, here shown partially schematically in end elevation. The length of main winding roll 90 is equal to the maximum width of any of the transparent sheets 22 of this invention. The numerals 92–108 denote feeder rolls upon which is wound a supply of the cladding coated transparent material 20, typically polymethymethacrylate. Prior to startup, the free ends of flexible members 22 are attached to a common line along the length of main roll element 20, this common line being denoted at FIG. 24 by the numeral 114. The main roll 90 is now caused to turn, in the indicated direction, with the result that the cladded plastic film 22 is unwound from each of the supply rolls 92-108 to make (in this case) nine layer thickness. This process is now repeated eight additional times, so that each of the feeder rolls 92-108 may now be wound with a nine layer thick laminate of sheets 22. The process previously described with respect to FIG. 24 is now repeated, to thus obtain a single roll of a laminate defined by 81 sheets or layers. This process is now repeated eight additional times, and the supply rolls 92-108 are now each provided with an 81 layer thick laminate, the process is repeated, with the final result that main roll 90 now carries a layer of 729 sheets thickness. The reader will understand that the final step may be employed using only eight of the supply rolls 92-108, in which case a final laminate having 648 sheets is obtained.

Figure 25:
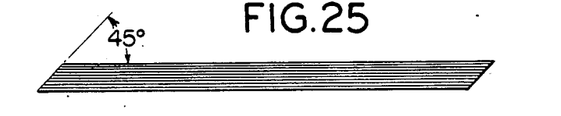
FIG. 25 is a view illustrating the configuration of a stack of light conducting sheets of this invention after they have been stacked and their edges cut at a 45 degree angle, with these cut edges having been silvered as shown at FIG. 14 or unsilvered as shown at FIG. 13.

Referring now to FIG. 25, the laminate defined by the 648 sheets is now cut at a 45 degree angle at each end, to thereby obtain the 45 degree angle illustrated at FIG. 3 for example. This is also shown at FIGS. 13 and 14. The ends which have been cut at the 45 degree angle shown at FIG. 25 may now be silvered, as illustrated at FIG. 14 to obtain a silvered reflecting surface 32.

The length of the stack shown at FIG. 25 is approximately equal to the overall length of the device illustrated at, for example, FIG. 2.

Figure 26:
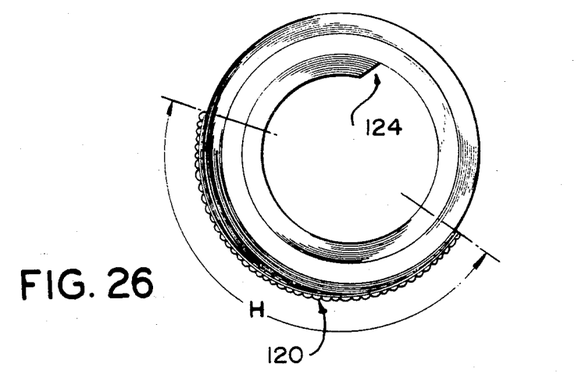
FIG. 26 is a view illustrating a method of attaching a sheet of lenticular lenses to the stepped edges of one end of the stack of FIG. 25 when the stack is rolled.

Referring now to FIG. 26, an embodiment is illustrated wherein the individual lenses of an elongated, lenticular lens sheet are added to or are associated with each of the exit faces 32 of the reader of FIG. 2 for example. This modification is carried out by wrapping the stack indicated at FIG. 25 around itself to form a generally cylindrical, plural layer member shown at FIG. 26. The lenticular lens array at FIG. 26 is denoted generally by the numeral 120. The angular extent of lenticular array 120 is denoted by H, this being the same H referred to in FIG. 1 and designates the longitudinal extent of the reading device of, for example, FIG. 2. After wrapping the stack shown at FIG. 25 in the manner indicated at FIG. 26, the lenticular array is applied, as by adhesive, to form, in cross-section, the modification illustrated at FIG. 30. The reader will immediately comprehend that the adhesive (not illustrated at FIG. 30) must be transparent and it will also be apparent as to how the lenses 122 of lenticular plate or sheet 120 are associated with each of the exit edges 32. It will be observed that the space delta of FIG. 8 between the output termini of sheets 22 are accurately determined by this mode of manufacture.

Figures 27, 28, 29:
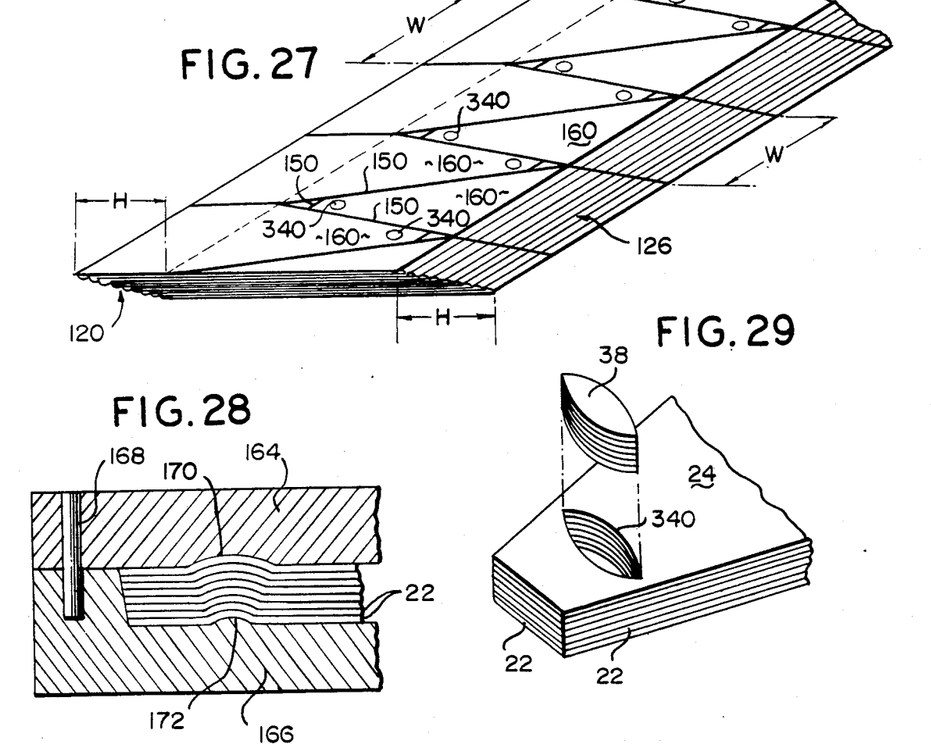
FIG. 27 is a view illustrating the configuration of a stack of sheets such as shown at FIG. 25, with a second sheet of lenticular lenses having been added to the other edge of the rolled stack of FIG. 26, after the latter has been unrolled.
FIG. 28 is a view illustrating an apparatus for the compression forming of geodesic lenses.
FIG. 29 is a view schematically indicating the insertion of two dimensional lenses into a stack of optical sheet elements of this invention.

Referring now to FIG. 27, the rolled sheet elements of FIG. 26, after the lenticular array 120 has been placed on and glued to the stepped viewing area 28 is unwrapped, to thereby yield the array of FIG. 27. Unwrapping from FIG. 26, the inner end 124 (again see FIG. 26) becomes distorted so that the spacing between the edges of former inner edge 124 is the same as the spacing between the light output ends directly beneath lenticular lens array 120. Again the spaces delta of FIG. 8 are accurately maintained. In the position illustrated at FIG. 27, a second lenticular array 126 is now placed over the former inner portion 124 of FIG. 26. This may be also carried out by a transparent adhesive.

Figure 30:
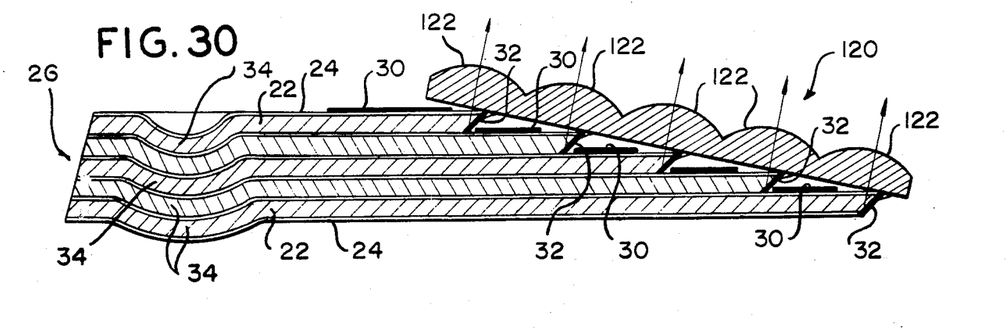
FIG. 30 is a view illustrating a typical geodesic lens optical device of this invention in combination with a lenticular lens sheet placed over its viewing zone 28.

Again referring to the array of FIG. 27, the stack of 648 sheets illustrated at FIG. 27 is now die cut along the solid lines 150 to arrive at the final configuration indicated at FIG. 30 of the drawings. The reader will understand that each portion 160 of the array of FIG. 27 which is defined by the die cut lines 150 nearly defines an optical device such as illustrated at FIG. 30. Again referring to FIG. 27, the numeral 340 denotes the location of the stacked or nested two dimensional lenses.

FIG. 28 illustrates one method of die pressing with heat and pressure to obtain nested geodesic lenses such as shown at FIG. 11. In FIG. 28 an upper die 164 which may be heated is placed against a lower die 166, alignment being effected by means of a pin 168. A boss 170 in upper die 164 cooperates with a complementary recess 172 to deform the 648 sheets 22. In FIG. 29 a stack of lenses 38 is inserted into a cut aperture located at position 340. In practice, each cut aperture 340 at FIG. 29 is slanted, so that each of the individual lenses 38 is spaced a different distance along its corresponding sheet 22, as indicated at FIG. 7.

While the invention has been illustrated and described as magnifying already recorded information, such as optical images on a microfiche or motion picture film, it will be understood that the reverse operation can be made. Namely, the optical information which is to be recorded may be placed at the viewing portion of the apparatus and light directed in the reverse direction to unexpected photosensitive material carried by a microfiche or cassette.

I claim:
1. An optical magnifying device comprising,
 (a) a plurality of light conducting, totally internally reflecting stacked sheets, each sheet defining a single optical system and having only a single longitudinal optic axis, the optic axes of the sheets being parallel, each sheet being optically isolated from its neighbors,
 (b) each sheet having an optical input edge and an optical output edge, said edges being spaced along said longitudinal optic axis,
 (c) the output edge of each sheet being longitudinally spaced from the output edge of its next adjacent sheet, as measured in a direction along the longitudinal optic axes of the sheets, to thereby form an open faced, output edge stepped face structure, the spacing between the output edges being greater than the thickness of the input edges of each sheet,
 (d) means for projecting light from the output edges, in a direction substantially at right angles to the surface of the stepped face of the stepped structure, the ratio between the spacing between adjacent optical output edges of the sheets and the spacing between the mid-thickness of adjacent sheets at their optical input edges being $m_H$, where $m_H \geq 1$,
 (e) whereby a straight line of length h on the optical input edges of the stacked sheets, in a direction parallel to the direction of thickness of the input edges of each of said stacked sheets, is imaged as a line of length $m_H h$ on the stepped face structure, in a direction along said longitudinal axes,
 (f) each sheet having a two-dimensional lens positioned on its optic axis, the lens located between the optical input edge of the sheet and the sheet optical output edge, to thereby image spaced input points of light on the input edge to homologous points along the output edge, the lens and length of each sheet yielding a magnification $m_W$ as light travels along the length of each sheet, with $m_W \geq 1$, (g) whereby a line of light of length $w$ on the optical input edges of the stacked sheets, in a direction orthogonal to the direction of thickness of the input edges of each of said stacked sheets, is imaged as a line of length $m_w w$ along and on the optical output edge of said sheet.

2. The optical magnifying device of claim 1 wherein $m_H = m_W$.

3. The device of claim 1 wherein the lens in each sheet is positioned relative to its input and output edges such that the magnification $m_H$ is the same for each sheet, even though the lengths of the sheets along their longitudinal optic axes are different, whereby uniform magnification in a direction parallel to the output edges is obtained for each sheet.

4. The device of claim 3 wherein the index of refraction of all of the sheets is the same.

5. The device of claim 1 wherein the lens in each of the sheets is positioned at the same distance from the input edge of each sheet, and wherein the indices of refraction of the sheets are different, such that the magnification $m_H$ is the same in each sheet even though the lengths of the sheets along their longitudinal optic axes are different, whereby uniform magnification in a direction parallel to the long side of the output edges is obtained for each sheet.

6. The device of claim 1 wherein the two-dimensional lenses have varying focal lengths, the distance between a two-dimensional lens and the output edge of its sheet being different from sheet to sheet.

7. The device of claim 6 wherein the two-dimensional lenses are nested.

8. The device of claim 6 wherein the two-dimensional lenses are each inserted into the plane of a respective sheet, the index of refraction of each two-dimensional lens being different from the index of refraction of its corresponding sheet.

9. The device of claim 6 wherein at least one of the input and output edges of each sheet of the stacked sheets are curved, the radii of curvature located within the sheet.

10. The device of claim 9 wherein the radii of curvature of the stacked sheets vary from sheet to sheet.

11. The device of claim 1 wherein said clause (d) means is defined by a skiving of each output edge of each sheet, to thereby cause projection by total internal reflection.

12. The device of claim 1 wherein said clause (d) means is defined by a skiving of each output edge of each sheet, each skived edge being reflectively coated.

13. The device of claim 1 wherein said clause (d) means is defined by a 90 degree bend of each output edge.

14. The device of claim 1 wherein the stacked sheets are folded.

15. The device of claim 14 wherein the fold is flexible.

16. The device of claim 1 wherein the output edge stepped face structure is provided with an overlying lenticular lens sheet comprised of a plurality of lenses whose optic axes are each aligned with a corresponding output edge of a sheet.

17. The device of claim 16 wherein the output edge of any sheet is located at the focal line of a corresponding lenticular lens.

18. A method for producing the device of claim 1, including the steps of, forming a first laminate roll of $N_1$ totally internally reflecting sheets, forming a second laminate roll from $N_2$ rolls each having $N_1 \times N_2$ of said sheets, forming a third laminate roll from $N_3$ rolls each having $N_1 \times N_2 \times N_3$ sheets.

19. The method of claim 18 including the additional step of, unrolling the roll having $N_1 \times N_2 \times N_3$ sheets, skiving in the same direction the longitudinally opposite edges of the stack of sheets obtained upon said unrolling, the longitudinally opposite edges of the stack of sheets being spaced apart by a distance substantially equal to the length of the device.

20. The method of claim 19 including the additional step of coating the skived edges with a reflective coating.

21. The method of claim 19 including the additional step of, temporarily securing together against relative sliding movement the sheets at one longitudinal edge of the stack of $N_1 \times N_2 \times N_3$ sheets, spirally winding the stack of sheets, to thereby cause the sheets of the opposite, non-secured longitudinal edge of the stack to become spaced from each other and the stepped output edge face structure of the device.

22. The method of claim 18 including the additional step of providing the stepped output edge face structure with a lenticular lens.

23. The method of claim 21 including the additional step of permanently securing together, against relative sliding motion, the stepped output edges, releasing the temporarily secured longitudinal edge, and then unwinding the spirally wound stack of sheets, whereby the temporarily secured and released edges define a second stepped output edge face structure.

24. The method of claim 23 including the additional step of providing at least one of said stepped output edge face structures with a lenticular lens.

25. The method of claim 24 including the step of providing the stacked sheets with a plurality of two-dimensional lenses.

26. The method of claim 25 including the additional step of die cutting the stack of sheets to form a plurality of said devices.

27. A method of magnifying an image contained in a first image surface, such as an image on a microfiche, including the steps of:

(a) optically dissecting an input image into a plurality of rectangular portions, (b) optically magnifying by a two-dimensional lens the rectangular portions in a direction parallel to the long side of each rectangle, whereby the magnified length is greater than the original length by some factor $m_W$ greater than unity, the magnification being completed at locations different from the location of the input image, the magnifying step being such that each of a plurality of image points located on any one of the input rectangular portions assumes a position within its magnified self which is homologous to its original position in its input rectangular portion, (c) the longitudinal axis of each input rectangle being in the same optical path as the longitudinal axis of its magnified self, (d) the short sides of the magnified rectangle being aligned, the longitudinal axes of the magnified rectangles being spaced from each other and being parallel, (e) the spacing between the longitudinal axes of the input rectangular portions being uniform and being less than the uniform spacing between corresponding output rectangular longitudinal axes, the ratio of these two spacing being $m_H$, where $m_H \geq 1$, (f) whereby an image of an object is broken up by dissection into a number of input rectangular portions, optical information at any one input rectangular portion being magnified in step (b) only in a direction parallel to the long side of each rectangular portion and wherein the magnification $m_H$ in the orthogonal direction is the ratio between (1) the spacing between the longitudinal axes of the adjacent magnified rectangular portions and (2) the corresponding spacing between the longitudinal axes of the input rectangular portions.

28. The method of claim 27 wherein $m_H = m_W$.

* * * * *